United States Patent
Sato

(10) Patent No.: US 11,835,476 B2
(45) Date of Patent: *Dec. 5, 2023

(54) SINGLE-CRYSTAL X-RAY STRUCTURE ANALYSIS APPARATUS AND SAMPLE HOLDER ATTACHING DEVICE

(71) Applicant: Rigaku Corporation, Tokyo (JP)

(72) Inventor: Takashi Sato, Tokyo (JP)

(73) Assignee: Rigaku Corporation, Tokyo (JP)

( * ) Notice: Subject to any disclaimer, the term of this patent is extended or adjusted under 35 U.S.C. 154(b) by 182 days.

This patent is subject to a terminal disclaimer.

(21) Appl. No.: 17/295,857

(22) PCT Filed: Nov. 21, 2019

(86) PCT No.: PCT/JP2019/045689
§ 371 (c)(1),
(2) Date: May 20, 2021

(87) PCT Pub. No.: WO2020/105720
PCT Pub. Date: May 28, 2020

(65) Prior Publication Data
US 2022/0128491 A1   Apr. 28, 2022

(30) Foreign Application Priority Data
Nov. 22, 2018 (JP) .................. 2018-218756

(51) Int. Cl.
*G01N 23/20025* (2018.01)
*G01N 23/20016* (2018.01)
*G01N 23/207* (2018.01)

(52) U.S. Cl.
CPC ..... *G01N 23/20025* (2013.01); *G01N 23/207* (2013.01); *G01N 23/20016* (2013.01)

(58) Field of Classification Search
CPC ............... G01N 23/20025; G01N 1/28; G01N 23/20016; G01N 23/207; G01N 2223/309
See application file for complete search history.

(56) References Cited

U.S. PATENT DOCUMENTS

| 6,918,698 B2 | 7/2005 | Nordmeyer et al. |
| 7,274,769 B2 | 9/2007 | Nordmeyer et al. |

(Continued)

FOREIGN PATENT DOCUMENTS

| JP | H06-194276 A | 7/1994 |
| JP | H11-304999 A | 11/1999 |

(Continued)

OTHER PUBLICATIONS

European Patent Office, EP Search Report issued in EP Application No. 19 886 782.2, Munich Germany, dated Sep. 8, 2022, 8 pages.

(Continued)

*Primary Examiner* — David P Porta
*Assistant Examiner* — Mamadou Faye
(74) *Attorney, Agent, or Firm* — ASLAN LAW, P.C.

(57) ABSTRACT

A single-crystal X-ray structure analysis apparatus capable of surely and easily performing operations of removing/attaching a sample soaked in a crystalline sponge from/to the apparatus, and a sample holder attaching device thereof, are provided. There are provided a sample holder attaching device comprising a sample holder attaching mechanism 600 that attaches the sample holder 250 to a goniometer 12 in the single-crystal X-ray structure analysis apparatus in a state where the sample holder 250 is removed from the applicator 300; wherein the sample holder 250 comprises a porous complex crystal capable of soaking the sample in a plurality of fine pores formed therein, and the porous complex crystal is fixed at a position of the sample holder 250 to which X-rays are irradiated from an X-ray irradiation (Continued)

section, in a state where the sample holder 250 is attached to the goniometer 12.

20 Claims, 13 Drawing Sheets

(56) References Cited

U.S. PATENT DOCUMENTS

| | | | |
|---|---|---|---|
| 7,660,389 B1* | 2/2010 | Becker | G01N 23/20016 378/81 |
| 7,696,991 B2 | 4/2010 | Higashi | |
| 10,190,952 B2 | 1/2019 | Fujita et al. | |
| 10,684,198 B2 | 6/2020 | Fujita et al. | |
| 2003/0068829 A1 | 4/2003 | Giaquinta et al. | |
| 2003/0152194 A1 | 8/2003 | Nordmeyer et al. | |
| 2005/0163280 A1 | 7/2005 | Nordmeyer et al. | |
| 2007/0005268 A1 | 1/2007 | Higashi | |
| 2007/0228049 A1 | 10/2007 | Nordmeyer et al. | |
| 2015/0219533 A1* | 8/2015 | Fujita | C30B 29/58 428/221 |
| 2017/0160212 A1* | 6/2017 | Kleine | G01T 7/005 |
| 2017/0219500 A1 | 8/2017 | Fujita et al. | |
| 2019/0137367 A1 | 5/2019 | Fujita et al. | |
| 2020/0096461 A1 | 3/2020 | Fujita | |

FOREIGN PATENT DOCUMENTS

| | | | |
|---|---|---|---|
| JP | 2003-083412 A | | 3/2003 |
| JP | 2007-003394 A | | 1/2007 |
| JP | 2013-156218 A | | 8/2013 |
| JP | WO 2014/038220 A1 | | 3/2014 |
| JP | 2014-130063 A | | 7/2014 |
| JP | WO 2016/017770 A1 | | 7/2017 |
| JP | 2018-155680 A | | 10/2018 |
| WO | WO 2011/115223 A1 | | 9/2011 |
| WO | WO 2015/132909 A1 | | 9/2015 |
| WO | WO 2018/159692 A1 | | 9/2018 |

OTHER PUBLICATIONS

Japan Patent Office (JPO), JP Office Action issued in JP Application No. 2020-557644, Japan, dated Oct. 18, 2022, 4 pages.
Yasuhide Inokuma, Makoto Fujita et al; "X-ray analysis on the nanogram to microgram scale using porous complexes"; Nature 495, 461-466; Mar. 28, 2013.
Hoshino et al., "The crystalline sponge method updated", IUCrJ, (2016), 3, 139-151.
猪熊泰英、常識を覆す結晶構造解析「結晶スポンジ」法.化学.
Yasuhide Inokuma, "'Crystal sponge' method overturns common sense of crystal structure analysis", Chemistry, vol. 68, No. 8, pp. 35-40, in particular, p. 39, fig.5, non-officieal translataion, Aug. 1, 2013.
猪熊泰英、「結晶スポンジ法による極小量化合物のX線結晶構造解析」.
Inokuma, Yasuhide et al, "X-ray crystallography of extremely small amount of compounds by crystal sponge method", Farumashia, 2014, vol. 50, No. 8, pp. 756-761, col. "5. Application of crystal sponge method", fig. 4, non-official translation.
U.S. Office Action issued in U.S. Appl. No. 17/295,854, dated Mar. 28, 2023.
International Search Report issued in PCT Application No. PCT/JP2019/045685, dated Feb. 18, 2020.
EP Search Report issued in EP Application No. 19 887 578.3, 8 pages, dated Sep. 19, 2022.
JP Office Action issued in JP patent application No. 2020-557640, dated Jan. 10, 2023.
JP Office Action (Decision of Refusal) issued in JP patent application No. 2020-557640, dated Apr. 18, 2023.
U.S. Office Action issued in U.S. Appl. No. 17/295,855, dated Mar. 13, 2023.
International Search Report issued in PCT Application No. PCT/JP2019/045686, dated Feb. 18, 2020.
EP Search Report issued in EP Application No. 19 886 916.6, 9 pages, dated Sep. 14, 2022.
JP Office Action issued in JP patent application No. 2020-557641, dated Jan. 10, 2023.
JP Office Action (Decision of Refusal) issued in JP Application No. 2020-557641, dated Apr. 18, 2023.
U.S. Office Action issued in U.S. Appl. No. 17/295,856, dated Apr. 12, 2023, USA, USPTO, 12 pages.
International Search Report issued in PCT Application No. PCT/JP2019/045687, dated Feb. 18, 2020, JPO, Japan, 2 pages.
EP Search Report issued in EP Application No. 19 886 255.9, dated Jul. 8, 2022, EPO, GErmany, 8 pages.
JP Office Action issued in JP patent application No. 2020-557642, dated Jan. 10, 2023, JPO Japan, 4 pages.
U.S. Notice of Allowance issued in U.S. Appl. No. 17/295,855, USPTO, Alexandria VA U.S.A., dated Jun. 13, 2023, 38 pages.
U.S. Notice of Allowance issued in U.S. Appl. No. 17/295,856, USPTO, Alexandria VA U.S.A., dated Jul. 20, 2023, 39 pages.
U.S. Notice of Allowance issued in U.S. Appl. No. 17/295,856, USPTO, Alexandria VA U.S.A., dated Aug. 24, 2023, 41 pages.

* cited by examiner

SINGLE-CRYSTAL X-RAY STRUCTURE ANALYSIS APPARATUS AND SAMPLE HOLDER ATTACHING DEVICE

CROSS-REFERENCE TO RELATED APPLICATIONS

This application claims priority to JP Patent Application No. 2018-218756 filed on Nov. 22, 2018, and this application claims priority to and is a 371 of international PCT Application No. PCT/JP2019/045689 filed on Nov. 21, 2019, the entire contents of which are hereby incorporated by reference.

TECHNICAL FIELD

The present invention relates to a next-generation single-crystal X-ray structure analysis apparatus capable of analyzing a structure of a material by an aggregative microstructure such as its atomic or molecular arrangement, and relates specifically to configurations of a single-crystal X-ray structure analysis apparatus and a sample holder attaching device that are inclusive of attaching a single-crystal sample as an analysis object to an apparatus.

BACKGROUND ART

In research and development for new devices and materials, the materials are ordinarily synthesized and evaluated to determine the next research policy based on the foregoing. In a structure analysis of a material using X-ray diffraction for performing material development in a short period of time, a search method of a material structure centering on the material structure analysis capable of efficiently performing the structure analysis, and an X-ray structure analysis used therein are indispensable for efficiently searching the material structure that realizes the function/physical property of an object material.

However, it has been difficult for those other than X-ray specialists to perform the structure analysis based on the results obtained by the foregoing method. Therefore, an X-ray structure analysis system with which the structure analysis can be performed by anyone who is not even a specialist of X-rays has been demanded. In this regard, particularly, as is known from the following Patent Document 1, the single-crystal X-ray structure analysis has gained attention as a method capable of catching a precise and highly accurate three-dimensional structure of molecules.

On the other hand, in this single-crystal X-ray structure analysis, there has been such a large constraint that a single-crystal needs to be prepared by crystallizing a sample. However, as is known from not only the following Non-Patent Documents 1 and 2 but also Patent Document 2, the single-crystal X-ray structure analysis becomes widely applicable for those including a liquid compound that cannot be crystallized, a sample incapable of acquiring a sufficient amount for crystallization, and so forth by development of a material called "crystalline sponge" (for example, a porous complex crystal in which countless pores each having a diameter of 0.5 to 1 nm are formed).

PRIOR ART DOCUMENT

Patent Document

Patent Document 1: Japanese Unexamined Patent Application Publication No. 2007-3394
Patent Document 2: Re-publication of PCT International Publication WO2016/017770

Non-Patent Document

Non-Patent Document 1: Makoto Fujita; X-ray analysis on the nanogram to microgram scale using porous complexes; Nature 495, 461-466; 28 Mar. 2013
Non-Patent Document 2: Hoshino et al. (2016), The updated crystalline sponge method IUCrJ, 3, 139-151

SUMMARY OF THE INVENTION

Problems to be Solved by the Invention

However, in the single-crystal X-ray structure analysis as a conventional technique in which the above-described crystalline sponge is used, it is necessary to quickly and accurately perform a step of soaking a sample of a very small amount of approximately several ng to several μg separated by various devices in a framework of a very small and fragile crystalline sponge having a size of approximately 100 μm, and further a step of accompanying fine and precise operations in which the very small crystalline sponge in which the sample is soaked is taken out; is attached to a tool; and is installed at the X-ray irradiation position inside a single-crystal X-ray structure analysis apparatus. In addition, these fine and precise operations carried out in a short period of time largely affect the measurement result of the sample after being soaked in the crystalline sponge, thereby being very important operations.

Accordingly, the present invention has been achieved in view of problems in the above-described conventional technique, and the objective is, specifically, to enable quickly, surely and easily performing an operation of taking out a very fine and fragile crystalline sponge in which the sample for the single-crystal X-ray structure analysis with the crystalline sponge is soaked and attaching it to the X-ray irradiation position inside the apparatus, that is inclusive of utilizing the proposed sample holder according to the present invention, even if not having specialized knowledge of X-ray structure analysis, in other words, to provide a high-yield, efficient, very versatile and user-friendly single-crystal X-ray structure analysis apparatus that is inclusive of automatization of attaching the sample holder thereinto.

Means to Solve the Problems (1) It is a feature that a sample holder attaching device that attaches a sample holder that holds a sample into a single-crystal X-ray structure analysis apparatus that performs a structure analysis of a material, the device comprising a sample holder attaching mechanism that attaches the sample holder provided and attached to an attachable/detachable applicator, to a goniometer in the single-crystal X-ray structure analysis apparatus in a state where the sample holder is removed from the applicator; wherein the sample holder comprises a porous complex crystal capable of soaking the sample in a plurality of fine pores formed therein, and the porous complex crystal is fixed at a position, of the sample holder, where X-rays are irradiated from the X-ray irradiation section, in a state where the sample holder is attached to the goniometer.

(2) Further, it is a feature that the sample holder attaching device according to the present invention, wherein the sample holder attaching mechanism comprising a sample holder support section that supports the sample holder, and an applicator support section that supports the applicator; and wherein at least one of the sample holder support section and the applicator support section is movable in a direction of removing the sample holder from the applicator supported by the applicator support section, in a state where the sample holder is supported by the sample holder support section.

(3) Further, it is a feature that the sample holder attaching device according to the present invention, wherein the sample holder support section is movable in an extending direction of a pin-shaped holding part to which the porous complex crystal of the sample holder is attached.

(4) Further, it is a feature that the sample holder attaching device according to the present invention, wherein the sample holder support section is rotationally movable in the state where the sample holder is supported.

(5) Further, it is a feature that the sample holder attaching device according to the present invention, wherein the sample holder support section is movable in a direction of attaching the sample holder to a sample holder attachment position of the goniometer, in the state where the sample holder is supported.

(6) Further, it is a feature that the single-crystal X-ray structure analysis apparatus according to the present invention is a single-crystal X-ray structure analysis apparatus that performs a structure analysis of a material, the apparatus comprising an X-ray source that generates X-rays; the sample holder; a goniometer that rotationally moves with the sample holder being attached thereto; an X-ray irradiation section that irradiates the X-rays from the X-ray source to the sample held by the sample holder attached to the goniometer; an X-ray detection measurement section that detects and measures X-rays diffracted or scattered by the sample; a structure analysis section that performs a structure analysis of the sample based on the diffracted or scattered X-rays detected by the X-ray detection measurement section; and the sample holder attaching device according to any one of (1) to (4).

Effect of the Invention

According to the above-described present invention, a series of operations including soaking a sample in a very small and fragile crystalline sponge, followed by installing it in an apparatus, after soaking a small amount of sample therein can be quickly, surely and easily carried out by using an attaching mechanism thereof, together with a sample holder and an applicator that are proposed according to the present invention, without accompanying conventional precise and fine operations for which rapidness is also required; in other words, a high-yield, efficient, very versatile and user-friendly single-crystal X-ray structure analysis apparatus that is inclusive of automatization of attaching the sample holder thereinto is provided. Thus, it becomes possible to make a single-crystal X-ray structure analysis with a crystalline sponge be easily usable, and to widely spread it.

DETAILED DESCRIPTION OF EMBODIMENTS

Next, the single-crystal X-ray structure analysis apparatus in which a crystalline sponge is utilized, according to one embodiment of the present invention, is described in detail referring to the attached drawings. In addition, the expression of "A or B" in the present application means "at least one of A and B", and includes "A and B" unless there are exceptional circumstances where no possibility of A and B exists.

Figure 1:
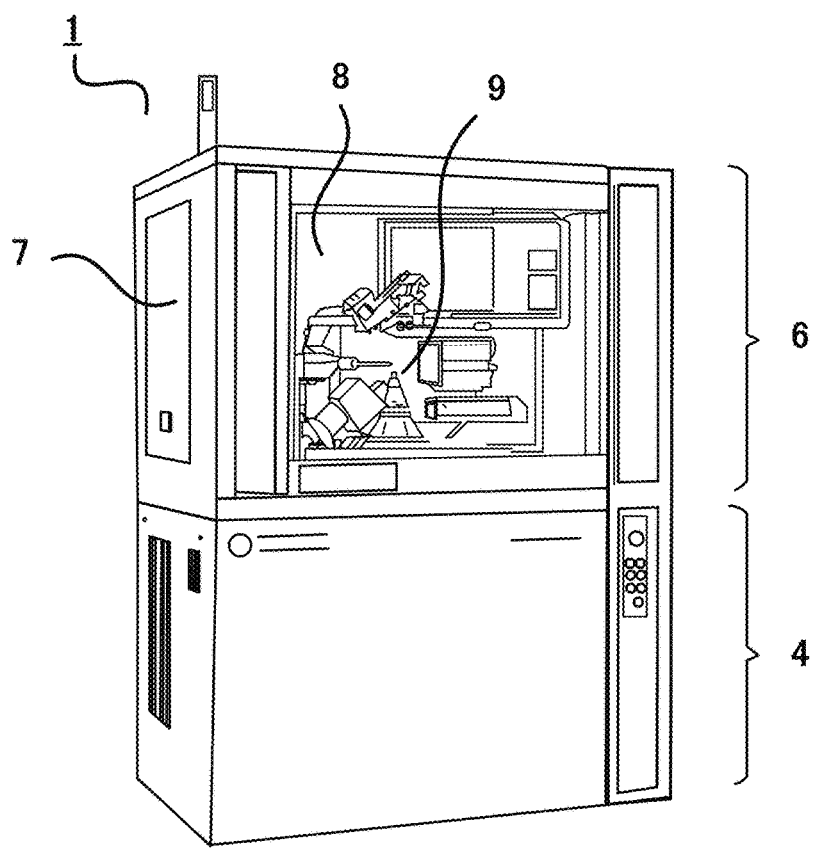
FIG. 1 is a diagram showing a whole configuration of a single-crystal X-ray structure analysis apparatus provided with a single-crystal X-ray diffractometer that is to be one embodiment of the present invention.

The attached FIG. 1 shows the entire appearance configuration of a single-crystal X-ray structure analysis apparatus including a single-crystal X-ray diffractometer according to one embodiment of the present invention, and as is clear from the figure, the single-crystal X-ray structure analysis apparatus 1 comprises a base stand 4 in which a cooling device and an X-ray generation power supply unit are stored, and an X-ray protection cover 6 placed on the base stand 4.

The X-ray protection cover 6 is provided with a casing 7 for surrounding the single-crystal X-ray diffractometer 9, a door 8 provided in front of the casing 7, and so forth. The door 8 provided in front of the casing 7 is openable, and in this opened state, various operations can be performed for the internal single-crystal X-ray diffractometer 9. In addition, the present embodiment as shown in the figure is directed to the single-crystal X-ray structure analysis apparatus 1 provided with the single-crystal X-ray diffractometer 9 for performing a structure analysis of a material using the crystalline sponge mentioned below.

Figure 2:
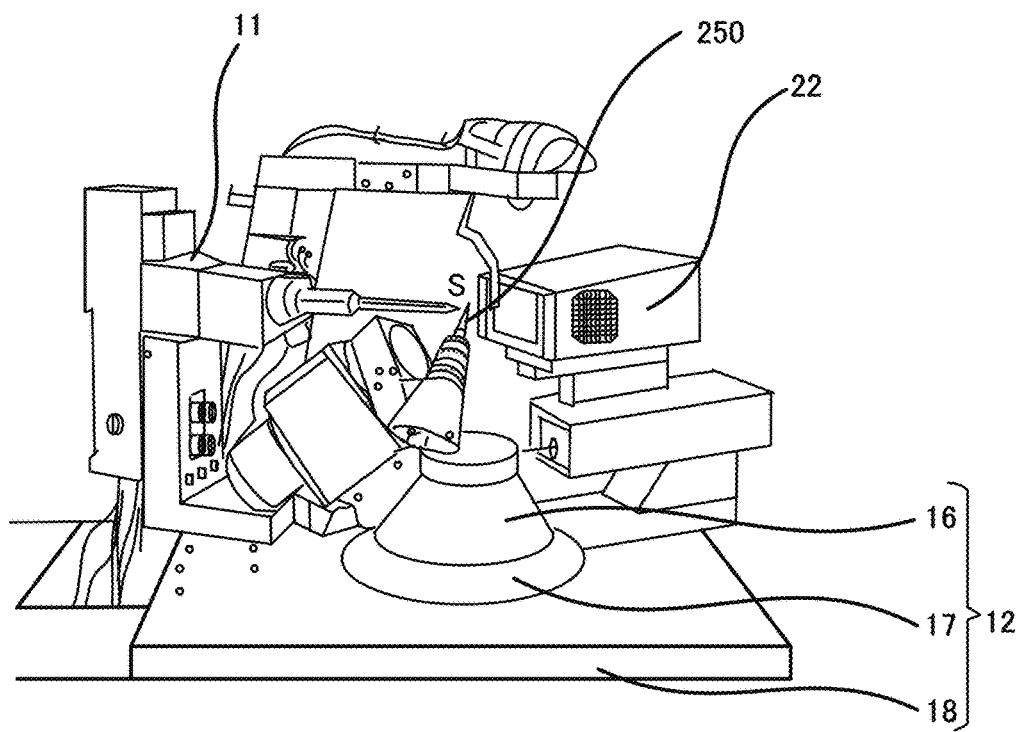
FIG. 2 is a diagram showing a configuration of the above-described single-crystal X-ray diffractometer.

The single-crystal X-ray diffractometer 9 comprises an X-ray tube 11 and a goniometer 12, as shown in FIG. 2 as well. The X-ray tube 11 comprises a filament, a target (referred to also as "anticathode") arranged so as to be opposed to the filament, and a casing for airtightly storing them, though not shown in the figure herein. This filament subjected to current applied by the X-ray generation power supply unit stored in the base stand 4 of FIG. 1 generates heat to emit thermal electrons. Further, a high voltage is applied between the filament and the target by the X-ray generation power supply unit, and the thermal electrons emitted from the filament are accelerated by the high voltage, and collide with the target. This collision area forms an X-ray focus, and X-rays are generated from the X-ray focus, and are spread out. In more detail, though not shown in the figure herein, the X-ray tube 11 comprising a microfocus tube and an optical element such as a multilayer focusing mirror or the like enables irradiation with higher brightness beam, and can also be selected from a radiation source such as Cu, Mo, Ag or the like. As exemplified above, the filament, the target arranged so as to be opposed to the filament, and the casing for airtightly storing them serve as an X-ray source, and a configuration for X-ray irradiation comprising the microfocus tube and the optical element such as the multilayer focusing mirror or the like serves as an X-ray irradiation section.

Further, the goniometer 12 supporting a sample S to be analyzed comprises a θ rotation table 16 that is rotatable centering on a sample axis line ω passing through an X-ray incident point of the sample S, and a 2θ rotation table 17 that is arranged around the θ rotation table 16 and is rotatable centering on the sample axis line ω. In addition, according to the present embodiment, the sample S is soaked inside a crystalline sponge previously attached to a part of the sample holder 250 mentioned below. Driving devices (not shown in the figure) for driving the above-described θ rotation table 16 and 2θ rotation table 17 are stored inside a base 18 of the goniometer 12, and the θ rotation table 16 is driven by these driving devices to be intermittently or continuously rotated at a predetermined angular speed so as to make a so-called θ rotation. Further, the 2θ rotation table 17 is driven by these driving device to be intermittently or continuously rotated so as to make a so-called 2θ rotation. The above-described driving device can be constituted from any structure, and for example, can be constituted from a power transmission structure comprising a worm and a worm wheel.

An X-ray detector 22 is placed on a part of the outer periphery of the goniometer 12, and the X-ray detector 22 is constituted from, for example, CCD type and CMOS type two-dimensional pixel detectors, a hybrid type pixel detector, or the like. In addition, an X-ray detection measurement section means a configuration in which X-rays diffracted or scattered by the sample are detected and measured, and comprises the X-ray detector 22 and a control section that controls the same.

The single-crystal X-ray diffractometer 9 is constituted as described above, and thus the sample S is θ-rotated centering on the sample axis line ω by the θ rotation of the θ rotation table 16 in the goniometer 12. During the θ rotation of this sample S, X-rays generated from the X-ray focus inside the X-ray tube 11, that is directed to the sample S enter the sample S at a predetermined angle, and are diffracted/scattered. That is, the incident angle of X-rays entering the sample S changes depending on the θ rotation of the sample S.

When the Bragg diffraction condition between an incident angle of X-rays entering the sample S and a crystal lattice plane is satisfied, diffraction X-rays are generated from the sample S. The diffraction X-rays are received by the X-ray detector 22 to measure an X-ray intensity thereof. From those described above, an angle of the X-ray detector 22 with respect to the incident X-rays, that is, an intensity of the diffraction X-rays corresponding to a diffraction angle is measured, and a crystal structure concerning the sample S and so forth are analyzed from this measurement result.

Figure 3A:
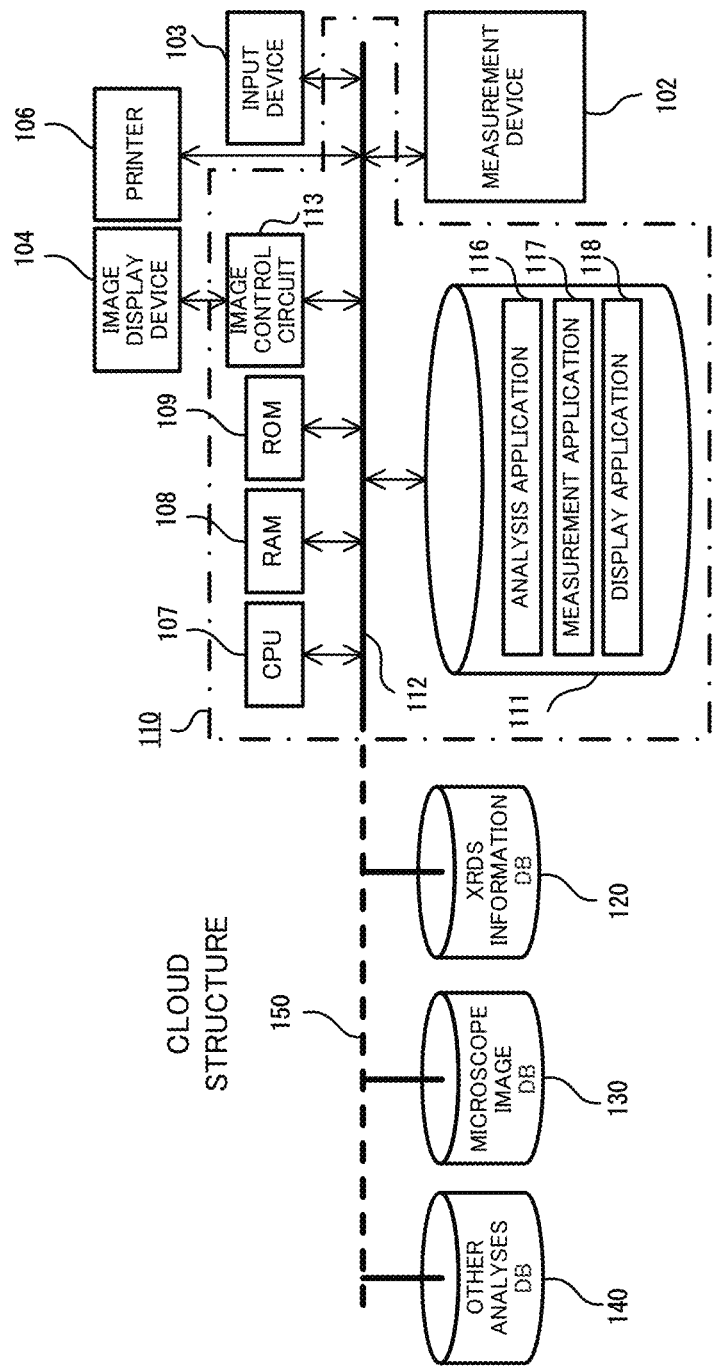
FIG. 3A is a block diagram showing an electrical configuration inside the above-described single-crystal X-ray structure analysis apparatus.

Next, FIG. 3A shows one example of the detail of an electrical internal configuration constituting a control section 110 in the above-described single-crystal X-ray structure analysis apparatus. In addition, as a matter of course, the present invention is not limited to the following embodiments according to the present invention.

This single-crystal X-ray structure analysis apparatus 1 includes the above-described internal configuration and further comprises a measurement device 102 for measuring a suitable material used as a sample; an input device 103 constituted from a keyboard, a mouse and so forth; an image display device 104 as display means; a printer 106 as means for printing and outputting the analysis result; CPU (Central Processing Unit) 107; RAM (Random Access Memory) 108; ROM (Read Only Memory) 109; a hard disk 111 as an external storage medium, and so forth. These elements are electrically and mutually connected by a bus 112.

The image display device 104 constituted from an image display unit such as a CRT display, a liquid-crystal display or the like displays an image on a screen in accordance with an image signal generated by an image control circuit 113. The image control circuit 113 generates the image signal based on image data input therein. The image data input in the image control circuit 113 is generated by an operation of various calculation means, achieved by a computer comprising CPU 107, RAM 108, ROM 109, and the hard disk 111. An inkjet plotter, a dot printer, an inkjet printer, an electrostatic transfer printer, or any other printing unit having arbitrary structure can be used for the printer 106. In addition, the hard disk 111 can also be constituted from a magneto-optical disk, a semiconductor memory, or any other storage medium having arbitrary structure.

Analysis application software 116 for managing the overall operation of the single-crystal X-ray structure analysis apparatus 1, measurement application software 117 for managing the operation of the measurement processing using the measurement device 102, and display application software 118 for managing the operation of the display processing using the image display device 104 are stored inside the hard disk 111. A predetermined function is achieved after reading these pieces of application software from the hard disk 111, as needed, to transfer them to RAM 108.

This single-crystal X-ray structure analysis apparatus 1 further comprises for example, a database placed in a cloud area, the database for storing various measurement results including measurement data obtained by the above-described measurement device 102. Referring to an example of the figure, as is explained below, an XRDS information database 120 that stores XRDS image data obtained by the above-described measurement device 102, and a microscope image database 130 that stores actually observed images obtained by the microscope, and further, for example, measurement results obtained by analysis performed with not X-rays but XRF, Raman ray or the like, and another analysis database 140 that stores physical property information are shown. In addition, these databases are not necessarily stored inside the single-crystal X-ray structure analysis apparatus 1, and for example, they may be provided outside and be mutually connected to be able to communicate through a network 150 or the like. In this manner, the single-crystal X-ray structure analysis apparatus 1 receives and manages various measurement results including measurement data obtained by detecting X-rays diffracted or scattered by a sample with the X-ray detection measurement section while controlling a measurement processing operation using the measurement apparatus 102. Further, structure analysis of the sample is performed with a structure analysis section, based on various measurement results including the measurement data obtained by detecting the X-rays diffracted or scattered by the sample.

Figure 3B:
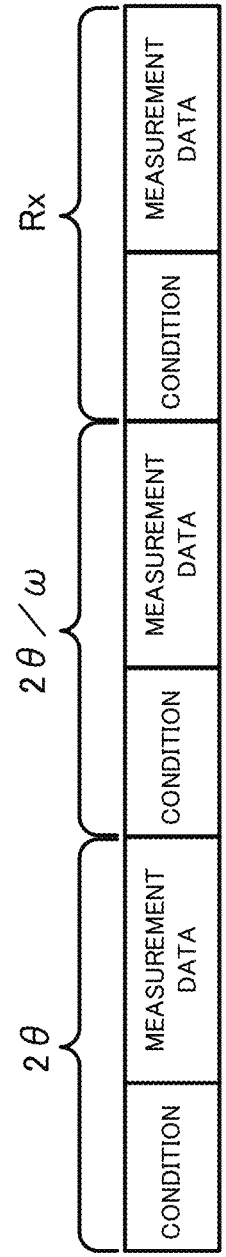
FIG. 3B is a configuration inside the data file.

A method of storing individual measurement data inside an individual file is also taken into account as a file management method for storing a plurality of pieces of measurement data inside a data file, but according to the present embodiment, as shown in FIG. 3B, the plurality of pieces of measurement data are set to be continuously stored inside one data file. In addition, referring to FIG. 3B, storage areas each in which "condition" is written are an area for storing every kind of information including device information and measurement conditions when obtaining the measurement data.

As such measurement conditions, (1) name of measurement object material, (2) type of measurement device, (3) measurement temperature range, (4) measurement start time, (5) measurement end time, (6) measurement angle range, (7) moving speed in scanning movement system, (8) scanning condition, (9) type of X-rays incident on sample, (10) whether or not to use attachments such as a sample high-temperature device, and so forth, are conceivable and various other conditions are also conceivable.

Figure 4:
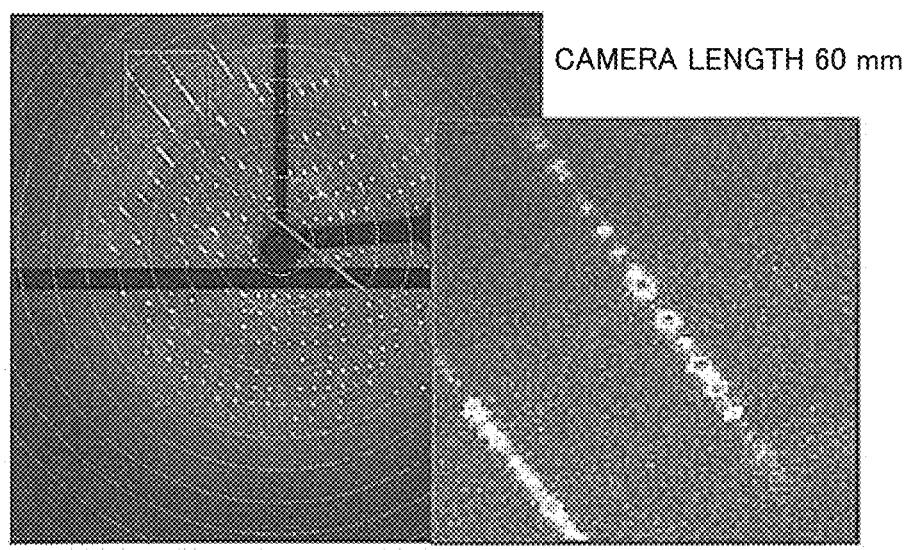
FIG. 4 is a diagram including a photograph showing an XRDS pattern or an image obtained by the above-described single-crystal X-ray structure analysis apparatus.

An XRDS (X-ray Diffraction and Scattering) pattern or an image (Refer to FIG. 4) is obtained by receiving/accumulating X-rays received on a flat plane that is a two-dimensional space of the X-ray detector 22 constituting the above-described measurement device 102 for each pixel arranged in planar array, that constitutes the detector, and by measuring an intensity thereof. For example, a pattern or an image on a two-dimensional space of r and θ can be obtained by detecting the intensity of X-rays received by an integral, for each pixel of the X-ray detector 22.

<Measurement Application Software>

The XRDS pattern or the image on an observation space, that is obtained by diffraction and scattering of X-rays caused by an object material for irradiation of the X-rays reflects information of an electron density distribution in an actual space of the object material. However, the XRDS pattern being on the two-dimensional space of r and 0 does not directly represents symmetry in the actual space of the object material as a three-dimensional space. Accordingly, it is generally difficult to specify the (spatial) arrangement of atoms and molecules that constitute the material with only the existing XRDS image, and thus a specialized knowledge of X-ray structure analysis is required. Therefore, according to the present Example, automatization is achieved by adopting the above-described measurement application software.

Figure 5A:
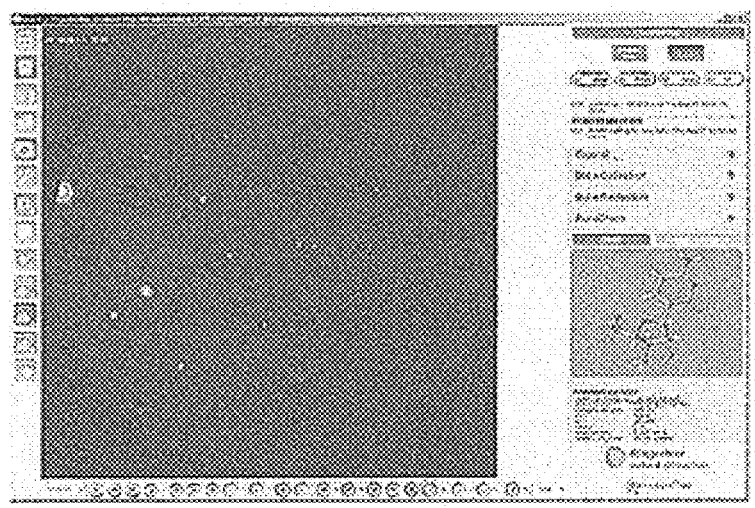
FIG. 5A (5B) is a diagram including a photograph showing one example of a screen obtained by executing X-ray diffraction data measurement/processing software on the above-described single-crystal X-ray structure analysis apparatus.
Figure 5B:
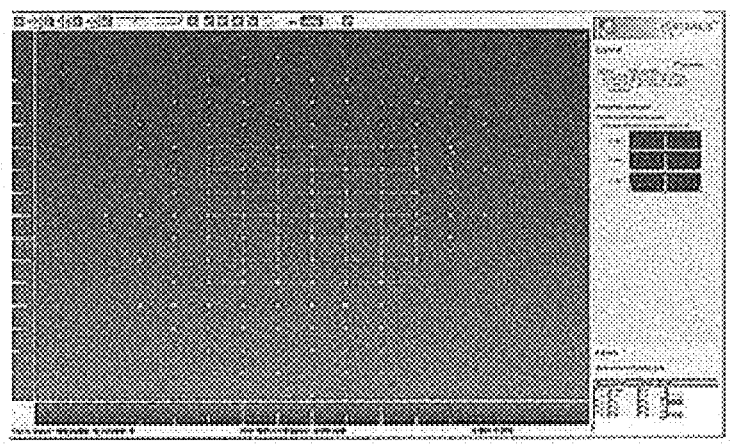
Figure 6:
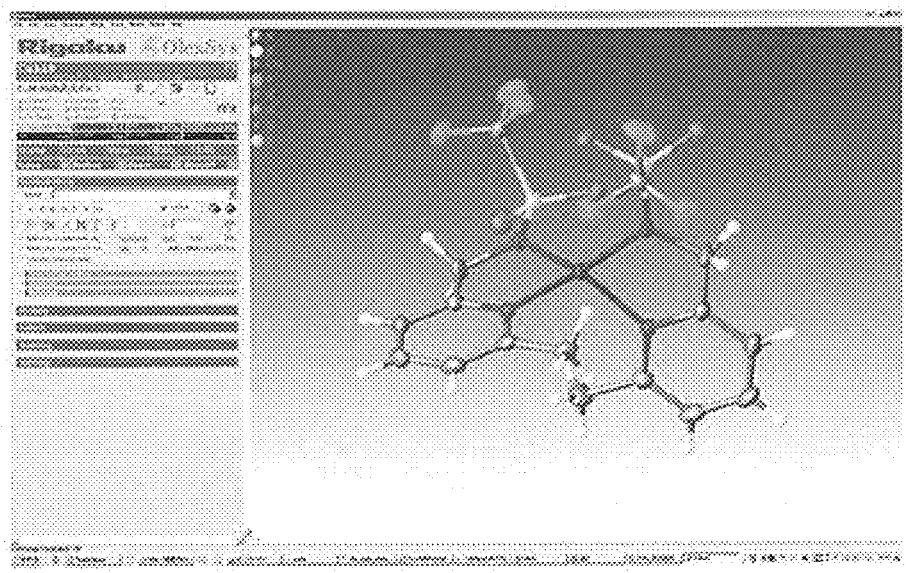
FIG. 6 is a diagram including a screen showing a molecular model prepared using a structure analysis program of the above-described single-crystal X-ray structure analysis apparatus.

For one example, as shown in the execution screens of FIGS. 5A and 5B, X-ray diffraction data measurement/processing software called "CrysAlis$^{Pro}$" that is a platform for single-crystal structure analysis is installed to execute preliminary measurement, setting of measurement conditions, main measurement, data processing and so forth. Further, structure analysis and structure refinement are executed in parallel with X-ray diffraction data collection by installing an automatic structure analysis plug-in called "AutoChem". Then, from space group determination to phase determination, construction and correction of molecular modelling, structure refinement, final reporting, and preparation of a CIF file are executed by a structure analysis program called "Olex$^2$" as also shown in FIG. 6.

The whole structure of the single-crystal X-ray structure analysis apparatus 1, and its function have been described as above, and a crystalline sponge according to the present invention, and devices and tools related thereto are specifically described below in detail, referring to the attached drawings.

<Crystalline Sponge>

As described above, the single-crystal X-ray structure analysis has become widely applicable for those including a liquid compound that cannot be crystallized, a very small amount of a sample with several ng to several μg that is incapable of acquiring a sufficient amount to perform crystallization, or the like via development of a material called "crystalline sponge" as a very small and fragile porous complex crystal having an approximate size of several 10 μm to several 100 μm, in whose inside countless pores each having a diameter of 0.5 to 1 nm are formed.

However, in the current situation, in order to perform soaking (post-crystallization) as crystallization of a sample into a framework of the above-described crystalline sponge, as previously described, a step of soaking a very small amount of a sample, approximately several ng to several μg, separated by various pretreatment (separation) devices in a framework of a very small and fragile crystalline sponge having an outer diameter of approximately 100 μm provided after being immerged in a preserving solvent (carrier) such as cyclohexane or the like, inside a container, is required. Further, subsequently, a step of taking out, from a container, a very small, fragile and difficultly handleable crystalline sponge in a quick manner (in a short period of time in such an extent that the crystalline sponge is not broken due to drying), and accurately attaching it to an X-ray irradiation position inside a single-crystal X-ray diffractometer, more specifically, to a tip portion of a sample axis of the goniometer 12 (so-called goniometer head) while performing centering, is required. These steps are not only fine operations for which high preciseness is required but also those for which rapidness is required for the operator, regardless of whether having a specialized knowledge of X-ray structure analysis, thereby resulting in having a large influence on the measurement result of a sample after being soaked in the crystalline sponge. That is, these operations make single-crystal X-ray structure analysis using a very small crystalline sponge result in low yield, and thus this becomes one of the causes of suppressing the single-crystal X-ray structure analysis using the crystalline sponge from being widely used.

The present invention that has been accomplished based on the above-described inventor's knowledge enables quickly, surely and easily performing a single-crystal X-ray structure analysis with a very small and fragile crystalline sponge by using a sample holder for the crystalline sponge (also referred to simply as a sample holder) as described below, and a sample holder attaching mechanism together with a sample holder for the crystalline sponge (also referred to simply as a sample holder) as described below and an applicator that is a handling (operating) tool as also described below, in other words, achieves a high-yield, efficient, very versatile and user-friendly single-crystal X-ray structure analysis apparatus. That is, as to the analysis apparatus according to the present invention, there is a large constraint that the very small and fragile crystalline sponge in which a very small amount of a sample S is soaked is prepared, and further the sample S (crystalline sponge) needs to be taken up from a soaking container and precisely and quickly attached to a predetermined position at the tip portion of the goniometer 12 in a short period of time in such an extent that the crystalline sponge is not broken due to drying, but specifically in order to achieve the very versatile and user-friendly apparatus that is inclusive of automatization of attaching the sample holder thereinto, such operations need to be made quickly and easily executable without requiring highly specialized knowledge as well as operation preciseness.

The present invention described below in detail resolves such a problem, that is, provides an apparatus and a method for performing a high-yield, efficient, very versatile and user-friendly single-crystal X-ray structure analysis quickly, surely and easily by anyone, including an operation of attaching a sample soaked in the crystalline sponge into an apparatus, while also using a very small, fragile and difficultly handleable crystalline sponge; and further provides a tool therefor.

Figure 7A:
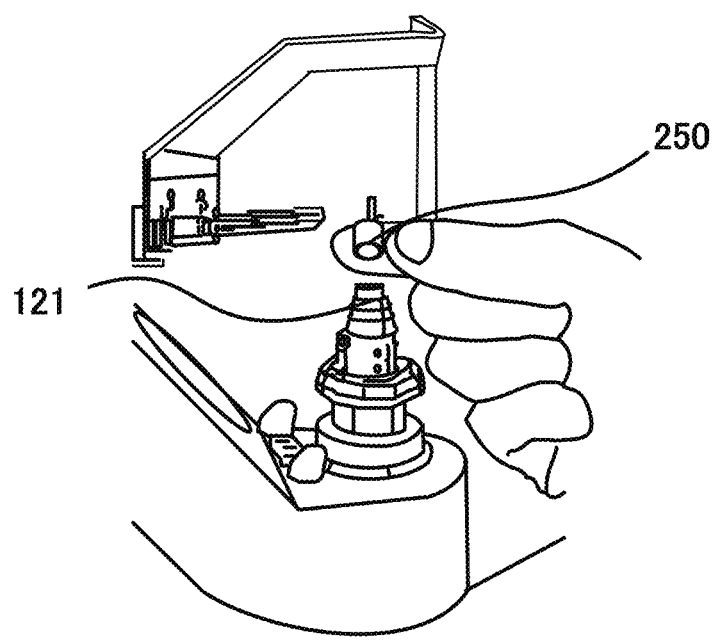
FIG. 7A is a diagram including a photograph showing one example of a structure centering on a goniometer of the above-described single-crystal X-ray diffractometer.
Figure 7B:
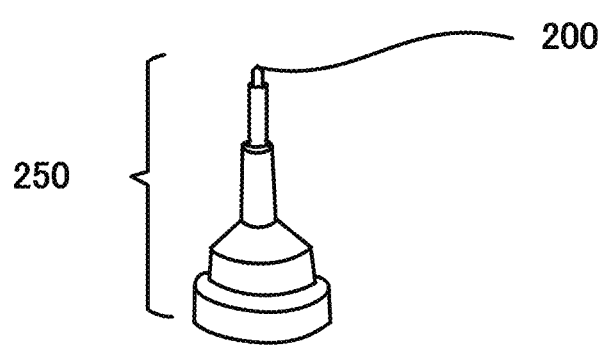
FIG. 7B is a diagram showing the sample holder.

FIG. 7A shows a tip portion of the goniometer 12 in an enlarged view, and this figure shows a state that, the sample holder 250, being in an enlarged view as FIG. 7B, as a tool where the crystalline sponge 200 soaking a sample to be analyzed that is proposed according to the present invention is attached (mounted) to the goniometer head 121 at the tip portion of the goniometer 12 in advance. In addition, the sample holder 250, for example, can be attached/detached to/from the goniometer head 121 at the tip portion of the goniometer 12 by an attaching/positioning mechanism for which magnetic force or the like is used, and can be attached easily and accurately at an exact position by anyone.

<Sample Holder for Crystalline Sponge, and Applicator>

Figure 8:
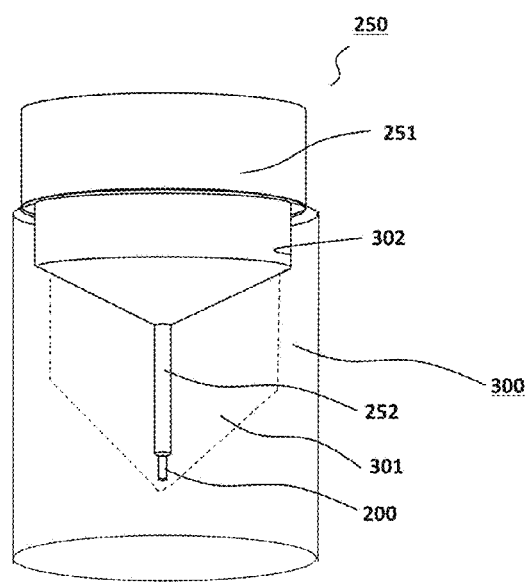
FIG. 8 is a perspective view showing a whole configuration of a sample holder to be attached to the above-described goniometer
Figure 9:
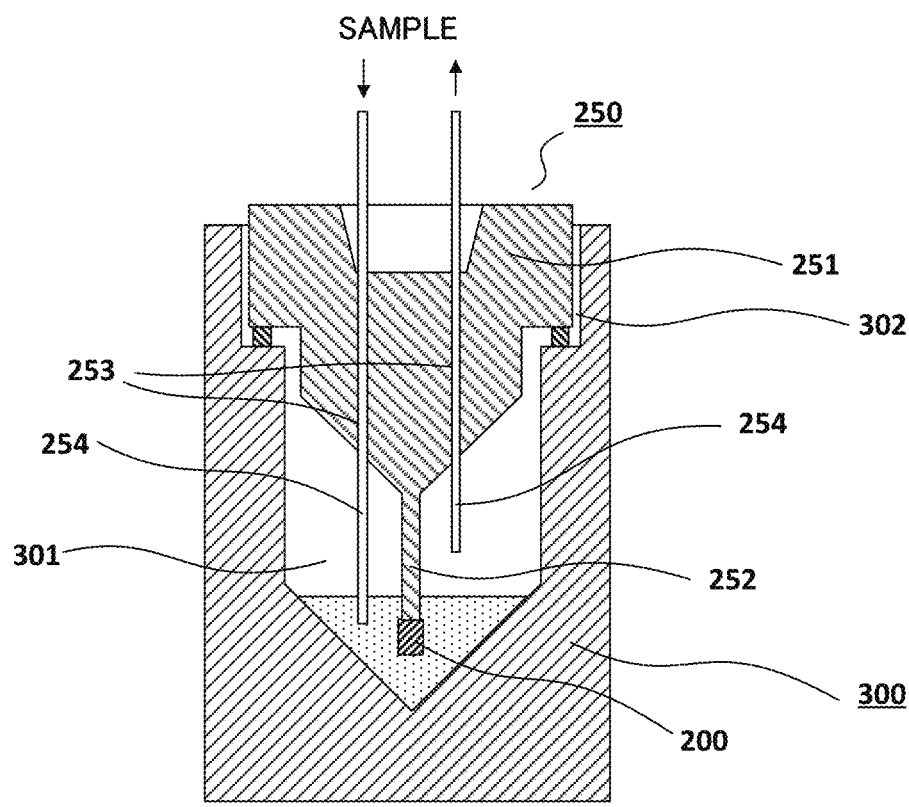
FIG. 9 is a sectional view of the sample holder to be attached to the above-described goniometer.

FIG. 8 shows a whole perspective view of the above-described sample holder 250, and FIG. 9 shows a sectional view thereof. In the sample holder 250, a pin (cylinder)-shaped sample holding part (hereinafter, referred to simply as a holding part) 252 (corresponding to the so-called goniometer head pin) is implanted vertically in the center of one surface (the lower surface in the figure) of the base part 251 of a disk or corn-shaped holder made of metal or the like attached to the goniometer head 121 {Refer to FIG. 7A} at the tip portion of the goniometer 12, and the crystalline sponge 200 in which the above-described sample to be analyzed is soaked is combinedly attached and fixed to the sample holder 250 beforehand at a predetermined position of the tip of the pin-shaped holding part 252. Further, the positioning mechanism or the like such as a magnet that is not shown in the figure, or the like is provided on the other surface (upper surface in the figure) of the disk-shaped base part 251. The sample holder 250 is detachably attached to the tip portion of the goniometer 12 by this positioning mechanism.

Further, in FIG. 8 as well as FIG. 9, the so-called applicator 300 used with the sample holder 250 is shown as a handling (operating) tool for soaking the sample in the crystalline sponge 200 attached to the sample holder in advance. This applicator 300 is, for example, formed from a transparent or non-transparent member made of glass, a resin, metal or the like, and a storing space 301 for storing the above-described sample holder 250 is formed inside thereof, and the opening 302 through which the sample holder 250 is fitted and taken out is further formed at the upper portion thereof.

Further, for example, seal portions (shown in FIG. 9 by hatched line parts) are provided at part of the opening 302 of the applicator 300 so as to be airtightly maintained from outside in a state of storing the sample holder 250 in the storing space 301 inside thereof. On the other hand, a pair of fine through holes 253, 253 for introducing a sample to be analyzed into the crystalline sponge 200 located inside (storing space 301) the applicator 300 are formed at the base part 251 of the sample holder 250. The fine holes 253, 253 exhibit preferable one example of a sample introduction structure, and other structures may be adopted. In addition, though not shown in the figure, seal portions are provided for these fine holes 253, 253. In this manner, as shown in the figure, the storing space 301 inside the applicator 300 is kept airtight even in a state where sample introduction tubes (hereinafter, referred to simply as introduction tubes) 254, 254 for introducing the sample into the crystalline sponge 200 are inserted in the fine holes 253, 253.

According to the sample holder 250 with such a configuration, alternatively, further by being combinedly provided (unified) with the applicator 300 as a handling (operating) tool thereof, the crystalline sponge 200 attached to the tip portion of the pin-shaped holding part 252 (corresponding to a goniometer head pin) constituting a part of the sample holder 250 can be safely and easily handled without damage or deviation from the sample holder 250. That is, the crystalline sponge 200 in which a very small amount of the sample is soaked can be safely, simply and easily prepared on the goniometer head 121 in a short and quick period of time in such an extent that no damage occurs due to drying, without any damage due to taking only it out from a soaking container like a conventional manner. According to the present Example, the sample holder 250 with which soaking of the sample is completed is removed from the applicator 300, and is attached to the goniometer head 121 {Refer to FIG. 7A} at the tip portion of the goniometer 12. In this manner, the sample S soaked in the crystalline sponge 200 is easily, precisely and quickly arranged at a predetermined position inside the single-crystal X-ray diffractometer 9 without requiring highly specialized knowledge and precise operations.

Figure 10:
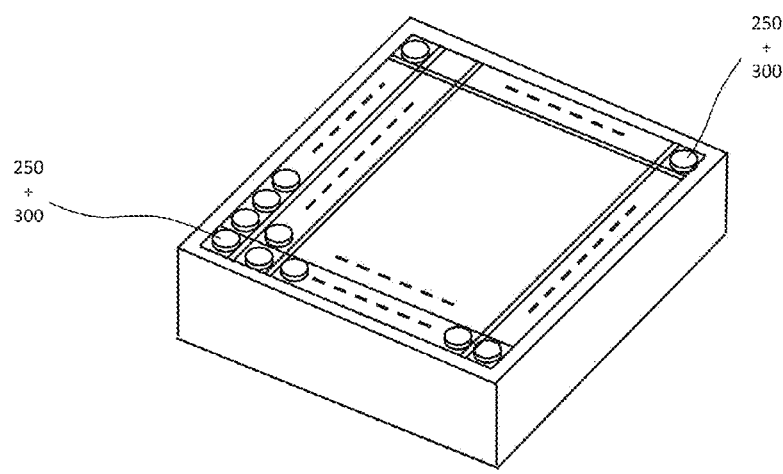
FIG. 10 is a diagram showing one example of a state in a case of providing the above-described sample holder as a set.

Further, when introducing the sample to be analyzed into the crystalline sponge 200, by using a soaking apparatus (soaking machine) with which one example is described below, more specifically, by inserting a pair of sample introduction tubes 254, 254 from the apparatus in fine through holes 253, 253, and introducing a very small amount of the sample into the above-described very small crystalline sponge 200, it is possible to soak the sample in the necessary crystalline sponge 200. Further, the sample holder 250 can be integrated (unified) with the applicator 300 as a handling (operating) tool thereof, and further can be provided as a so-called set by preparing the required number of them for the analysis operation and storing them in a box-shaped case, as also shown in FIG. 10.

<Single-Crystal X-Ray Structure Analysis Method Using Sample Holder for Crystalline Sponge>

Next, the single-crystal X-ray structure analysis method performed using the sample holder 250 to which the crystalline sponge 200 is previously attached is explained below. In addition, the sample holder 250 and the applicator 300 may be provided as an integral one (unit) or as a set, as described above.

Figure 11:
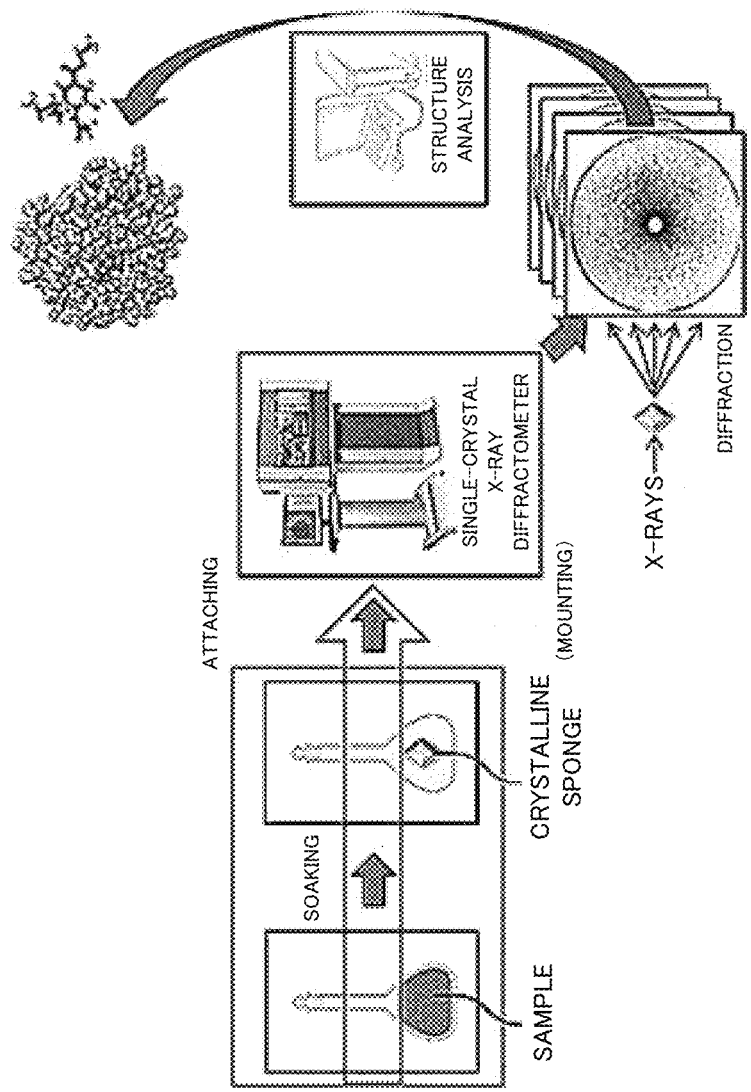
FIG. 11 is a flow diagram showing one example of a single-crystal X-ray structure analysis method using a sample holder.

FIG. 11 shows one Example according to the present invention given by conceptualizing the single-crystal X-ray structure analysis method using the sample holder 250. According to such a method, as described above, a very small amount of the sample is introduced into the sample holder 250 provided with the applicator 300 as an integral one (unit) to perform soaking required therein. In this case, according to the above-described example, in the state where the sample holder 250 is stored inside the applicator 300, the sample can be soaked in the crystalline sponge 200 attached to the tip of the sample holder 250 by inserting a pair of the sample introduction tubes 254, 254 into a pair of the fine through holes 253, 253 (Refer to FIG. 9) formed in the sample holder 250.

Figure 12:
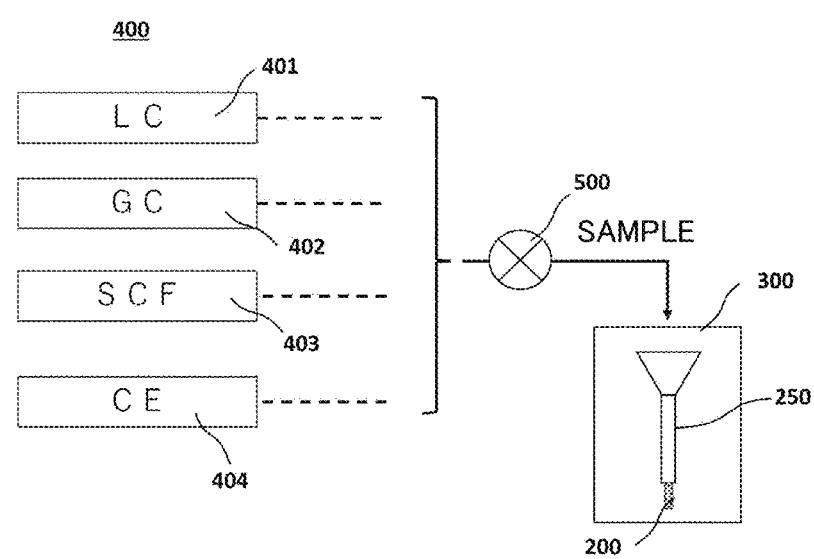
FIG. 12 is a diagram showing one example of a configuration of a pretreatment device used in the above-described single-crystal X-ray structure analysis method.

More specifically, as shown in FIG. 12, for example, a very small amount of the sample S extracted by LC (liquid chromatography) 401, GC (gas chromatography) 402, and further, SFC (supercritical fluid chromatography) 403, CE (electrophoresis) 404 and so forth that constitute a pretreatment device 400, together with a carrier thereof is supplied to a pair of the sample introduction tubes 254, 254 (Refer to FIG. 9) to be inserted in the fine holes 253, 253 of the sample holder 250 through the soaking device (soaking machine) 500 provided with every kind of a switching valve and a pressure adjustment device, that supplies a fluid under the necessary conditions (flow rate and pressure), and the sample is selectively introduced into the storing space 301 inside the applicator 300. That is, the sample is sent to the sample introduction tube 254 on the supply side from a tube on the supply side, and is supplied to the sample holder 250 inside the applicator 300 from the tip portion of the sample introduction tube 254 on the supply side. Only the sample, or a solution in which the sample and the preserving solvent (carrier) are mixed is supplied by flowing inside the sample introduction tube 254 on the supply side. In this manner, a very small amount of the sample S introduced thereto comes into contact with the crystalline sponge 200 attached to the tip of the pin-shaped holding part 252 of the sample holder 250 inside the storing space 301 of the applicator 300, and the sample is soaked therein. In addition, examples of the electrophoresis device herein include various electrophoresis devices concerning capillary electrophoresis, isoelectric point electrophoresis, and so forth. When using the soaking device 500, the excessive sample or a solution in which the sample and the preserving solvent (carrier) are mixed is discharged from the sample introduction tube 254 on the discharge side, after a predetermined time has elapsed in a state where the sample is injected. When not using the soaking device 500, the unnecessary preserving solvent (carrier) or solution flows inside the sample introduction tube 254 on the discharge side, and is discharged. Accordingly, it is possible that no sample flows through the sample instruction tube 254 on the discharge side. When using gas or supercritical fluid as a carrier, the carrier containing the sample is discharged.

Then, the sample holder 250 with which the step of soaking is completed is removed from the applicator 300, and is precisely attached to a predetermined position inside the single-crystal X-ray diffractometer 9, that is, to a position where an X-ray beam from the X-ray tube 11, the position corresponding to the tip of the goniometer head pin of the goniometer head 121 at the tip portion of the goniometer 12, is focused on and irradiated, for example, by using a sample holder attaching mechanism also described below and a positioning mechanism such as the above-described magnetic force or the like.

<Sample Holder Attaching Mechanism>

Figure 13:
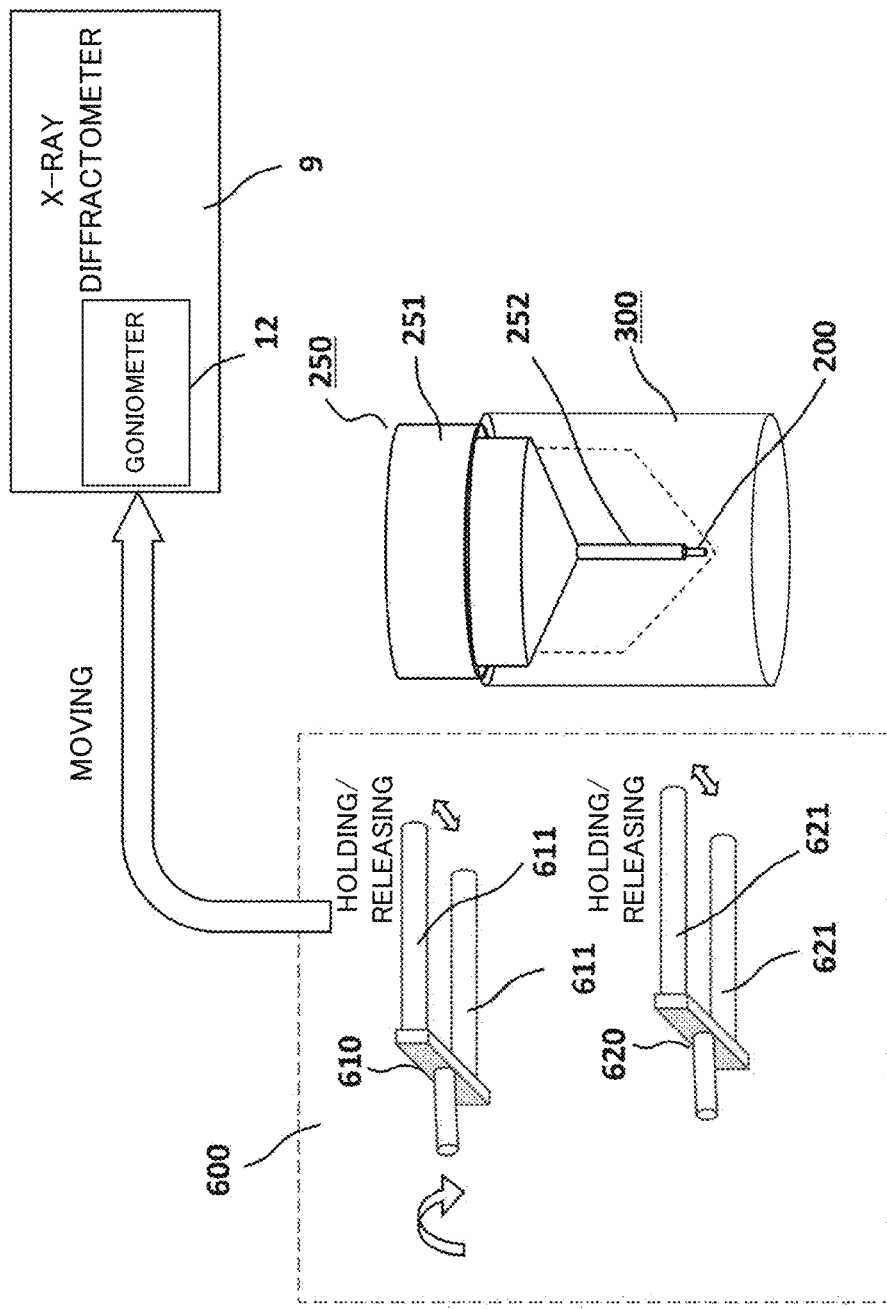
FIG. 13 is a conceptual diagram showing one example of a configuration of a removal/attachment mechanism of the sample holder to be attached to a goniometer by removing the sample holder in the above-described single-crystal X-ray analysis apparatus from an applicator.

FIG. 13 shows one example of a configuration of a sample holder attaching mechanism 600 for removing a sample holder 250 to which a crystalline sponge 200 where soaking described above is completed is attached, from the applicator 300; and for attaching (mounting) it to the goniometer head 121 at the tip portion of the goniometer 12. As also shown in the figure, the sample holder attaching mechanism 600 comprises a sample holder support section 610 including a pair of bar-shaped support parts 611, 611 that are arranged in parallel to each other and that move while approaching or separating to/from each other (Refer to an arrow in the figure) and hold/release the base part 251 of the sample holder 250 therebetween; and an applicator support section 620 including a pair of bar-shaped members 621, 621 that are similarly arranged in parallel to each other and that are movable while approaching or separating to/from each other (Refer to an arrow in the figure) and hold/release the applicator 300 therebetween. Specifically, the former sample holder support section 610 itself is constituted as to be further rotatable, and the position thereof is movable toward the goniometer head 121 of the goniometer 12, as shown in the figure by arrows. In addition, it is preferred that the sample holder attaching mechanism 600 is arranged at a position adjacent to the goniometer 12 inside the single-crystal X-ray diffractometer 9 in consideration of its function. In addition, the sample holder attaching mechanism 600 may be arranged outside the single-crystal X-ray diffractometer 9, for example, in the soaking machine 500 and between the soaking machine 500 and the single-crystal X-ray diffractometer 9, and so forth.

Figure 14:
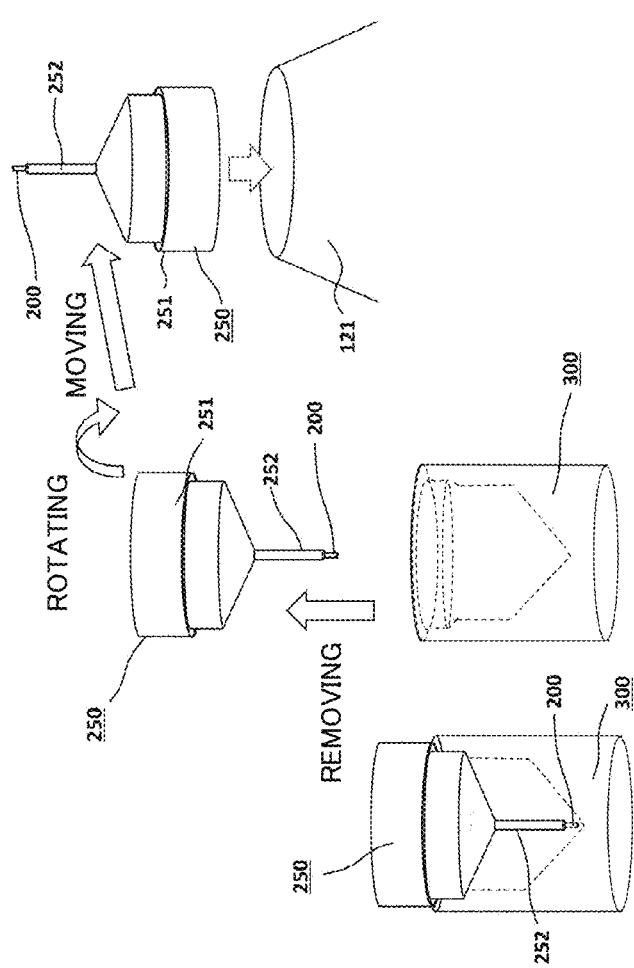
FIG. 14 is an operation explanatory diagram showing one example of removal/attachment operations by the above-described removal/attachment mechanism of the sample holder.

Then, the base part 251 of the sample holder 250 is supported by the sample holder support section 610, and the applicator 300 is simultaneously supported by the applicator support section 620; and the sample holder support section 610 subsequently moves in a direction of removing the supported sample holder 250 from the applicator 300, for example, in a vertical direction in this case, more specifically, along an extending direction of the pin-shaped holding part 252 as also shown in FIG. 14 by an arrow. According to those described above, the sample holder 250 can be safely removed from the applicator 300 with neither damage nor deviation caused by the crystal sponge 200 attached to the tip of the pin-shaped sample holding part 252, that comes into contact with a part of the applicator 300. Thereafter, the sample holder support section 610 itself rotates (Refer to the arrow in the figure) to attach the sample holder 250 to the goniometer head 121 of the goniometer 12 in a state of being flipped upside down of the sample holder 250.

Figure 15:
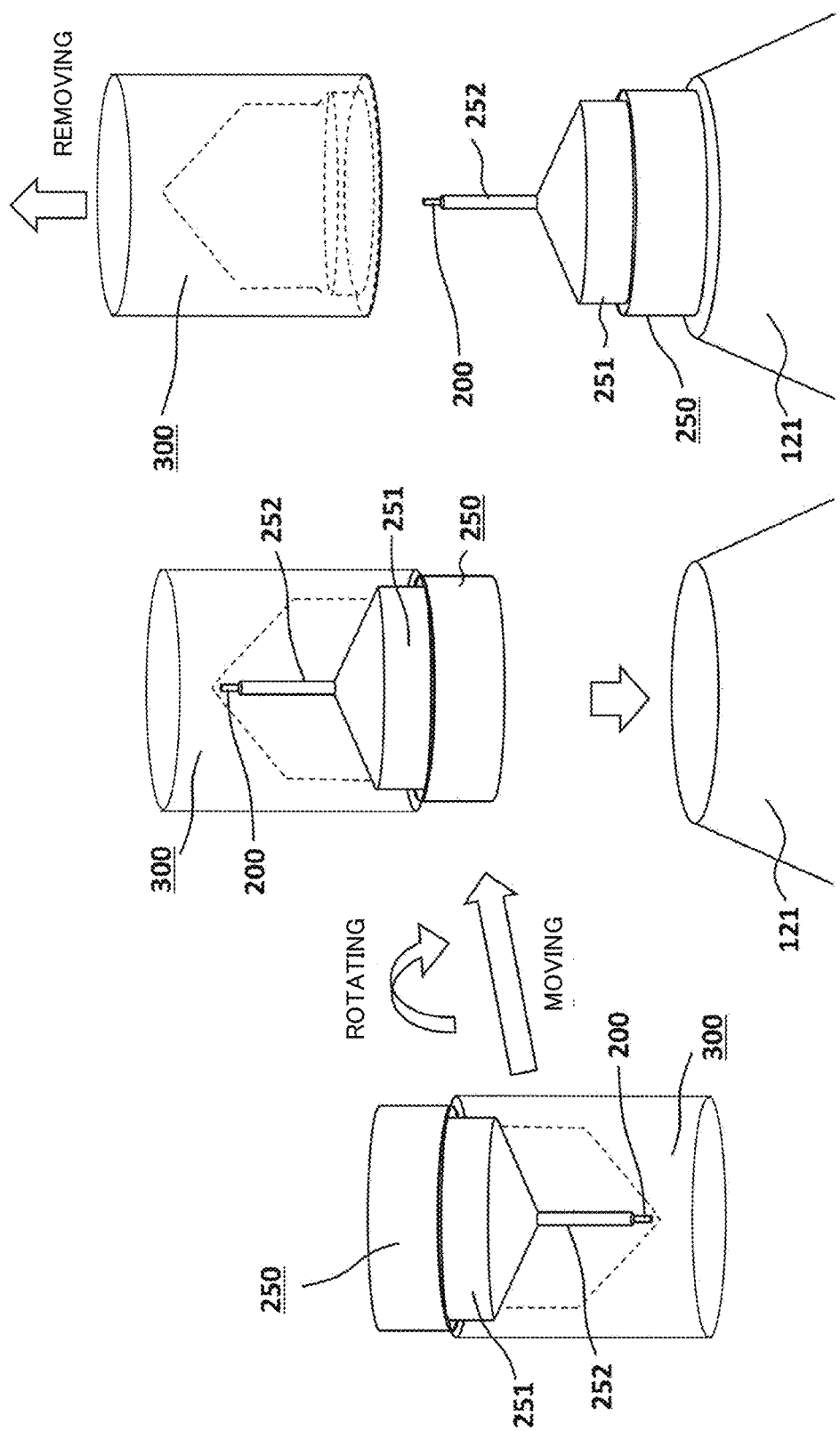
FIG. 15 is an operation explanatory diagram showing other removal/attachment operations by the above-described removal/attachment mechanism of the sample holder.

Alternatively, as also shown in FIG. 15, the sample holder 250 integrated with the applicator 300 may be attached onto the goniometer head 121 by being moved to the position of the goniometer head 121, and being rotated, in a state of supporting the outer periphery of the base part 251 (or the applicator 300) by the sample holder support section 610 (or the applicator support section 620). In addition, in this case, thereafter, the applicator support section 620 vertically moves in a stationary state after supporting the outer periphery of the applicator 300 with the applicator support section 620, and simultaneously supporting the base part 251 with the sample holder support part 610 to enable safely removing the crystalline sponge 200 from the applicator 300 with neither damage nor deviation caused by the crystalline sponge that comes into contact with a part of the applicator 300 similarly to the foregoing, and attaching it to the tip of the goniometer head 121. In addition, in those described above, it is explained that the sample holder support section 610 and the applicator support section 620 each are constituted from a pair of parallelly movable bar-shaped members, but it is obvious to one of ordinary skill in the art that these support sections are any means as long as they are capable of supporting a sample holder or an applicator, and may be alternatively constituted from other rotatable members or constituted by employing support means (support section) such as a so-called robot arm.

According to those described above, the crystalline sponge 200 attached to a part (tip) of the pin-shaped holding part 252 of the sample holder 250 attached to the tip of the goniometer head 121 of the goniometer 12 is to be precisely arranged at a position where an X-ray beam from the X-ray tube 11 is focused on and irradiated to, safely and quickly with neither damage nor deviation caused by the crystalline sponge that comes into contact with another region even when removing the sample holder 250 from the applicator 300 after soaking is completed. In other words, a sample soaked in the crystalline sponge 200 is precisely, quickly and safely arranged at a predetermined position inside the X-ray diffractometer 9, and intensity of X-rays diffracted from the sample S is subsequently measured by the single-crystal X-ray diffractometer to analyze a crystal structure thereof, and so forth.

In this manner, by using not only the sample holder 250 and the applicator 300 but also the sample holder attaching mechanism 600 according to the present invention, it becomes possible that a very small amount of sample is soaked in the crystalline sponge 200 in very small size, that is combinedly attached beforehand to the sample holder 250 easily and safely by anyone, and subsequently, the sample S is quickly and safely installed to the goniometer 12 as a precise position with high accuracy in a short period of time in such an extent that the crystalline sponge is not broken due to drying. In addition, then, it is identical to those in the current condition that X-rays diffracted and scattered by an object material are measured while irradiating X-rays having a required wavelength to the sample S by the above-described single-crystal X-ray diffractometer 9, and the structure analysis is performed by a measurement application software constituting the analysis apparatus to carry out construction of molecular modelling, preparation of a final report, and so forth. That is, it becomes possible that the present Example brings quick, safe and easy check of the molecular structure/aggregative structure (actual space) of a newly discovered or designed structure at sites and so forth of not only drug development and life science but also every kind of material research.

As described above in detail, according to the present invention, the single-crystal X-ray structure analysis using a very small and fragile crystalline sponge can be quickly, surely and easily performed without accompanying the conventionally required fine and precise operation by using not only newly proposed sample holder and applicator but also an attaching mechanism thereof even without having specialized knowledge of X-ray structure analysis, in other words, a very versatile and user-friendly single-crystal X-ray structure analysis apparatus that is capable of high-yield and efficient performance of the single-crystal structure analysis using the crystalline sponge and is inclusive of automatization of attaching the sample holder thereinto, is provided.

In addition, although various Examples according to the present invention are described above, the present invention is not limited to the above-described Examples and includes various modified examples. For example, the above-described Examples describe the entire system in detail in order to facilitate understanding of the present invention, but are not necessarily limited to those having all of the configurations that are described above. Further, a part of a configuration of one Example may be replaced with a configuration of another Example; further, a configuration of another Example may be added to a configuration of one Example; and with respect to a part of a configuration of each Example, addition/deletion/replacement of another configuration may be further performed.

The present invention is widely applicable for a searching method of a material structure, an X-ray structure analysis apparatus to be used for the same, and so forth.

In addition, the present international application claims priority under Japanese Patent Application No. 2018-218756, filed Nov. 22, 2018, and the entire content of Japanese Patent Application No. 2018-218756 is applied to the present international application.

EXPLANATION OF THE SYMBOLS

1 . . . Single-crystal X-ray structure analysis apparatus (whole), 9 . . . Single-crystal X-ray diffractometer, 11 . . . X-ray tube, 12 . . . Goniometer, 22 . . . X-ray detector, 102 . . . Measurement device, 103 . . . Input device, 104 . . . Image display device, 107 . . . CPU, 108 . . . RAM, 109 . . . ROM, 111 . . . Hard disk, 116 . . . Analysis application software, 117 . . . Measurement application software, 121 . . . Goniometer head, 250 . . . Sample holder, 200 . . . Crystalline sponge, 251 . . . Base part, 252 . . . Pin-shaped holding part, 253 . . . Fine hole, 254 . . . Sample introduction tube, 300 . . . Applicator, 301 . . . Storing space, 302 . . . Opening, 600 . . . Sample holder attaching mechanism, 610 . . . Sample holder support section, 620 . . . Applicator support section, and 611, 621 . . . Support part.

The invention claimed is:

1. A sample holder attaching device that attaches a sample holder that holds a sample into a single-crystal X-ray structure analysis apparatus that performs a structure analysis of a material, the sample holder attaching device comprising:

a sample holder attaching mechanism that attaches the sample holder provided and attached to an attachable/detachable applicator, to a goniometer in the single-crystal X-ray structure analysis apparatus in a state where the sample holder is removed from the applicator, wherein the sample holder comprises a base part that is detachably attached to the tip portion of the goniometer and a holding part to which a porous complex crystal capable of soaking the sample in a plurality of fine pores formed therein can be attached, the holding part is formed on the base part, the applicator has a storing space for storing the sample holder, and the sample holder attaching mechanism has a sample holder support section that enable removing the sample holder from the applicator and attaching the sample holder to the goniometer, and the porous complex crystal is fixed at a position of the sample holder, where X-rays are irradiated from an X-ray irradiation section, in a state where the sample holder is attached to the goniometer.

2. The sample holder attaching device according to claim 1,
wherein the sample holder attaching mechanism comprising:
an applicator support section that supports the applicator; and
wherein at least one of the sample holder support section and the applicator support section is movable in a direction of removing the sample holder from the applicator supported by the applicator support section, in a state where the sample holder is supported by the sample support section.

3. The sample holder attaching device according to claim 2,
wherein the sample holder support section is movable in an extending direction of a pin-shaped holding part to which the porous complex crystal of the sample holder is attached.

4. The sample holder attaching device according to claim 2,
wherein the sample holder support section is rotationally movable in the state where the sample holder is supported and can attach the sample holder to the goniometer with the sample holder flipped upside down from the state in which the sample holder is stored in the applicator.

5. The sample holder attaching device according to claim 2,
wherein the sample holder support section is movable in a direction of attaching the sample holder to a sample holder attachment position of the goniometer, in the state where the sample holder is supported.

6. A single-crystal X-ray structure analysis apparatus that performs a structure analysis of a material, the apparatus comprising:
an X-ray source that generates X-rays;
a sample holder that holds a sample;
a goniometer that rotationally moves with the sample holder being attached thereto;
an X-ray irradiation section that irradiates the X-rays from the X-ray source to the sample held by the sample holder attached to the goniometer;
an X-ray detection measurement section that detects and measures X-rays diffracted or scattered by the sample;
a structure analysis section that performs a structure analysis of the sample based on the diffracted or scattered X-rays detected by the X-ray detection measurement section; and
the sample holder attaching device according to claim 1.

7. The sample holder attaching device according to claim 3,
wherein the sample holder support section is rotationally movable in the state where the sample holder is supported.

8. The sample holder attaching device according to claim 3,
wherein the sample holder support section is movable in a direction of attaching the sample holder to a sample holder attachment position of the goniometer, in the state where the sample holder is supported.

9. The sample holder attaching device according to claim 4,
wherein the sample holder support section is movable in a direction of attaching the sample holder to a sample holder attachment position of the goniometer, in the state where the sample holder is supported.

10. The sample holder attaching device according to claim 7,
wherein the sample holder support section is movable in a direction of attaching the sample holder to a sample holder attachment position of the goniometer, in the state where the sample holder is supported.

11. A single-crystal X-ray structure analysis apparatus that performs a structure analysis of a material, the apparatus comprising:
an X-ray source that generates X-rays;
a sample holder that holds a sample;
a goniometer that rotationally moves with the sample holder being attached thereto;
an X-ray irradiation section that irradiates the X-rays from the X-ray source to the sample held by the sample holder attached to the goniometer;
an X-ray detection measurement section that detects and measures X-rays diffracted or scattered by the sample;
a structure analysis section that performs a structure analysis of the sample based on the diffracted or scattered X-rays detected by the X-ray detection measurement section; and
the sample holder attaching device according to claim 2.

12. A single-crystal X-ray structure analysis apparatus that performs a structure analysis of a material, the apparatus comprising:
an X-ray source that generates X-rays;
a sample holder that holds a sample;
a goniometer that rotationally moves with the sample holder being attached thereto;
an X-ray irradiation section that irradiates the X-rays from the X-ray source to the sample held by the sample holder attached to the goniometer;
an X-ray detection measurement section that detects and measures X-rays diffracted or scattered by the sample;
a structure analysis section that performs a structure analysis of the sample based on the diffracted or scattered X-rays detected by the X-ray detection measurement section; and
the sample holder attaching device according to claim 3.

13. A single-crystal X-ray structure analysis apparatus that performs a structure analysis of a material, the apparatus comprising:
an X-ray source that generates X-rays;
a sample holder that holds a sample;
a goniometer that rotationally moves with the sample holder being attached thereto;
an X-ray irradiation section that irradiates the X-rays from the X-ray source to the sample held by the sample holder attached to the goniometer;
an X-ray detection measurement section that detects and measures X-rays diffracted or scattered by the sample;
a structure analysis section that performs a structure analysis of the sample based on the diffracted or scattered X-rays detected by the X-ray detection measurement section; and
the sample holder attaching device according to claim 4.

14. A single-crystal X-ray structure analysis apparatus that performs a structure analysis of a material, the apparatus comprising:
 an X-ray source that generates X-rays;
 a sample holder that holds a sample;
 a goniometer that rotationally moves with the sample holder being attached thereto;
 an X-ray irradiation section that irradiates the X-rays from the X-ray source to the sample held by the sample holder attached to the goniometer;
 an X-ray detection measurement section that detects and measures X-rays diffracted or scattered by the sample;
 a structure analysis section that performs a structure analysis of the sample based on the diffracted or scattered X-rays detected by the X-ray detection measurement section; and
 the sample holder attaching device according to claim 5.

15. A single-crystal X-ray structure analysis apparatus that performs a structure analysis of a material, the apparatus comprising:
 an X-ray source that generates X-rays;
 a sample holder that holds a sample;
 a goniometer that rotationally moves with the sample holder being attached thereto;
 an X-ray irradiation section that irradiates the X-rays from the X-ray source to the sample held by the sample holder attached to the goniometer;
 an X-ray detection measurement section that detects and measures X-rays diffracted or scattered by the sample;
 a structure analysis section that performs a structure analysis of the sample based on the diffracted or scattered X-rays detected by the X-ray detection measurement section; and
 the sample holder attaching device according to claim 7.

16. A single-crystal X-ray structure analysis apparatus that performs a structure analysis of a material, the apparatus comprising:
 an X-ray source that generates X-rays;
 a sample holder that holds a sample;
 a goniometer that rotationally moves with the sample holder being attached thereto;
 an X-ray irradiation section that irradiates the X-rays from the X-ray source to the sample held by the sample holder attached to the goniometer;
 an X-ray detection measurement section that detects and measures X-rays diffracted or scattered by the sample;
 a structure analysis section that performs a structure analysis of the sample based on the diffracted or scattered X-rays detected by the X-ray detection measurement section; and
 the sample holder attaching device according to claim 8.

17. A single-crystal X-ray structure analysis apparatus that performs a structure analysis of a material, the apparatus comprising:
 an X-ray source that generates X-rays;
 a sample holder that holds a sample;
 a goniometer that rotationally moves with the sample holder being attached thereto;
 an X-ray irradiation section that irradiates the X-rays from the X-ray source to the sample held by the sample holder attached to the goniometer;
 an X-ray detection measurement section that detects and measures X-rays diffracted or scattered by the sample;
 a structure analysis section that performs a structure analysis of the sample based on the diffracted or scattered X-rays detected by the X-ray detection measurement section; and
 the sample holder attaching device according to claim 9.

18. A single-crystal X-ray structure analysis apparatus that performs a structure analysis of a material, the apparatus comprising:
 an X-ray source that generates X-rays;
 a sample holder that holds a sample;
 a goniometer that rotationally moves with the sample holder being attached thereto;
 an X-ray irradiation section that irradiates the X-rays from the X-ray source to the sample held by the sample holder attached to the goniometer;
 an X-ray detection measurement section that detects and measures X-rays diffracted or scattered by the sample;
 a structure analysis section that performs a structure analysis of the sample based on the diffracted or scattered X-rays detected by the X-ray detection measurement section; and
 the sample holder attaching device according to claim 10.

19. The sample holder attaching device according to claim 1, wherein
 the sample holder support section can hold/release the base part and hold the outer periphery of the base part for removal from the applicator and attachment to the goniometer.

20. The sample holder attaching device according to claim 2, wherein
 the sample holder support section can hold/release the base part and hold the outer periphery of the base part for removal from the applicator and attachment to the goniometer.

* * * * *